United States Patent [19]

Romann et al.

[11] 4,325,253

[45] Apr. 20, 1982

[54] APPARATUS FOR MEASURING THE MASS OF A FLOWING MEDIUM

[75] Inventors: Peter Romann, Stuttgart; Udo Hafner, Lorch, both of Fed. Rep. of Germany

[73] Assignee: Robert Bosch GmbH, Stuttgart, Fed. Rep. of Germany

[21] Appl. No.: 136,659

[22] Filed: Apr. 2, 1980

Related U.S. Application Data

[63] Continuation-in-part of Ser. No. 15,994, Feb. 28, 1979, abandoned.

[30] Foreign Application Priority Data

Mar. 4, 1978 [DE] Fed. Rep. of Germany ....... 2809455

[51] Int. Cl.$^3$ .............................................. G01F 1/68
[52] U.S. Cl. ...................................................... 73/204
[58] Field of Search .................................. 73/204, 116

[56] References Cited

U.S. PATENT DOCUMENTS

| | | | |
|---|---|---|---|
| 1,156,660 | 10/1915 | Berg | 73/204 |
| 1,257,568 | 2/1918 | Wilson | 73/204 |
| 1,260,498 | 3/1918 | Wilson | 73/204 |
| 3,971,247 | 7/1976 | Rodder | 73/27 |

OTHER PUBLICATIONS

"The Hot Wire Anemometer", Flow Corporation Bulletin, 5/66, p. 1.

*Primary Examiner*—Herbert Goldstein
*Attorney, Agent, or Firm*—Edwin E. Greigg

[57] ABSTRACT

A temperature-dependent resistor is embodied as a hot wire and secured by support elements in a probe ring. At least one of the support elements has a contact area having the smallest possible cross section on which a hot wire securing portion is defined. The hot wire is secured to the contact area at the securing portion. The contact area may be embodied, for example, as sharp-pointed or cylindrical and cause a minimum possible conduction of heat away from the hot wire along the support element, so that even during a glow burnoff process the entire hot wire length, up to the securing portion is burned free of deposits and thus continuously satisfactory functioning of the air flow rate meter is assured.

2 Claims, 4 Drawing Figures

APPARATUS FOR MEASURING THE MASS OF A FLOWING MEDIUM

CROSS-SECTION TO RELATED APPLICATIONS

This application is a continuation-in-part of U.S. patent application Ser. No. 015,994, filed Feb. 28, 1979, in the name of Udo Hafner and Peter Romann, now abandoned.

This application also discloses subject matter in common with application Ser. No. 083,696, filed Oct. 11, 1979, also in the name of Udo Hafner and Peter Romann.

BACKGROUND OF THE INVENTION

The invention relates to an apparatus for measuring the mass of a flowing medium, and in particular to measuring the intake air mass of internal combustion engines which includes at least one temperature-dependent resistor arranged in the flow of the medium, the temperature and/or resistance of this resistor being controlled in dependence on the mass of the flowing medium, and wherein the control variable is a measure for the mass of the flowing medium. The resistor comprises a hot wire which is mounted at support points in a probe ring.

An apparatus for measuring the mass of a flowing medium is known in which a hot wire is used as the temperature-dependent resistor. The hot wire is tautly stretched over a plurality of fastening elements in a sensor ring. In such an apparatus there is the danger that excessive conduction of heat away from the hot wire will occur via the fastening elements, which causes an undesirable restriction in measurement precision.

OBJECT AND SUMMARY OF THE INVENTION

It is therefore an object of this invention to have an apparatus for measuring the mass of a flowing medium like that described above which avoids the excessive conduction of heat away from the hot wire.

This objective is accomplished by providing the support points with areas in contact with the hot wire having the smallest possible cross section.

The apparatus according to the invention as summarized above has the advantage over the prior art that the conduction of heat away from the hot wire via the support elements is avoided to the greatest possible extent. Thus, more favorable conditions are created for complete burnoff of deposits on the hot wire as well, which occurs during a glow-heating burnoff process.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
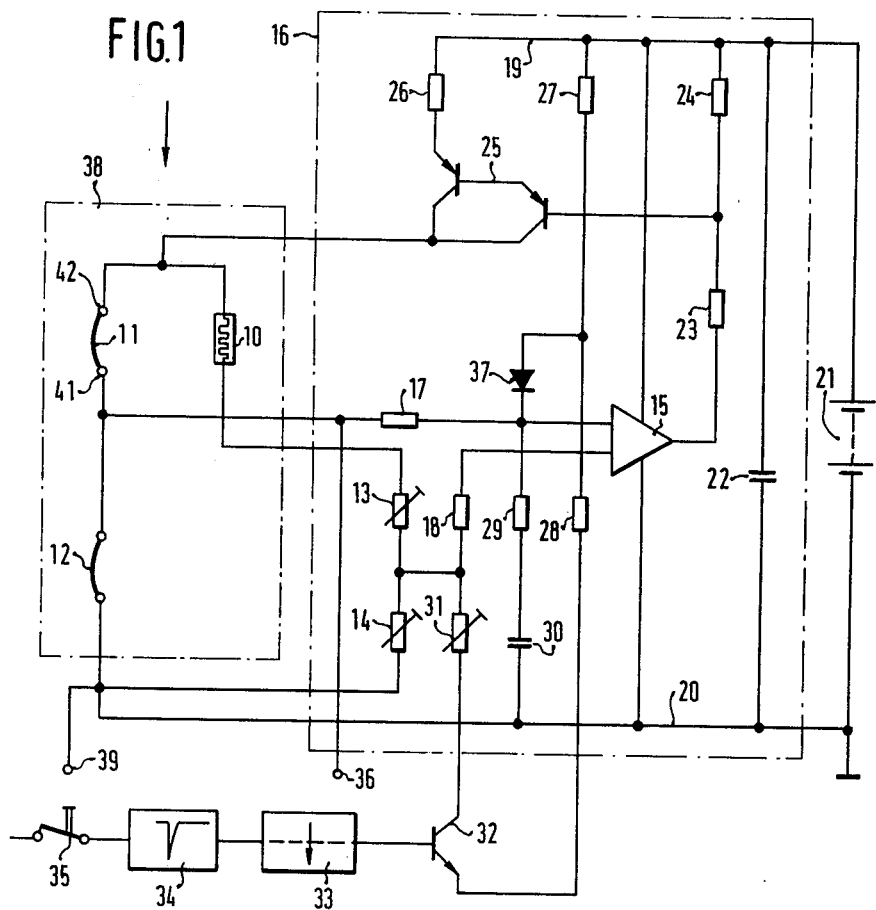
FIG. 1 is a circuit diagram of an apparatus for measuring the mass of a flowing medium, especially for measuring the intake air mass in internal combustion engines.

In the apparatus shown in FIG. 1 for measuring the mass of a flowing medium, especially for measuring the aspirated air flow in internal combustion engines, a bridge circuit is provided comprising a temperature-dependent resistor 10, a temperature-dependent resistor 11, a temperature-dependent resistor 12 and resistors 13 and 14. A control amplifier 15 of an electrical control device 16 is connected to the bridge diagonal. The inverting input of the control amplifier 15 is connected via an input resistor 17 with the junction of resistors 11 and 12, while the noninverting input of the control amplifier 15 is connected via an input resistor 18 to the junction of resistors 13 and 14. The control amplifier 15 is connected via two supply lines 19 and 20 with a source of direct current 21. A smoothing capacitor 22 is connected in parallel with the direct current source 21. The output of the control amplifier 15 is connected to the series circuit comprising two resistors 23 and 24, the resistor 24 being connected to the common supply line 19. These two resistors 23 and 24 comprise a voltage divider for a Darlington pair 25. The Darlington pair, together with a resistor 26 forms a voltage-controlled electrical current source for the supply of electrical current to the bridge circuit comprising resistors 10, 11, 12, 13 and 14. A voltage divider comprising resistors 27 and 28 is connected between the common supply lines 19 and 20. The anode of a diode 37 is connected to the junction of resistors 27 and 28, and the cathode of the diode 37 is connected to the inverting input of the control amplifier 15. A series circuit comprising one resistor 29 and one capacitor 30 is disposed between the inverting input of the control amplifier 15 and the common supply line 20, this resistor-capacitor combination serving the purpose of adapting the frequency of the control loop to the time behavior of the temperature-dependent resistors.

A resistor 31 is connected to the junction of resistors 13 and 14 and can be connected via the switching path of a switching transistor 32 with the common supply line 20. The base of the switching transistor 32 is connected to the output of a monostable multivibrator 33, which can be triggered via a differentiating element 34 by an ignition switch 35 of the ignition system of the internal combustion engine.

The mode of operation of the described apparatus is as follows:

A predetermined electrical current flows through the temperature-dependent resistor 11 of the bridge circuit and heats this resistor 11 to its normal operating temperature. In another arm of the bridge, the temperature-dependent resistor 10 asumes a resistance value which characterizes the temperature of the flowing medium, for instance the temperature of the air aspirated by the internal combustion engine. The temperature of the air aspirated by an internal combustion engine is therefore always used as a reference signal for the regulation of the heating current in the apparatus for air mass measurement. The temperature-dependent resistor 11 is cooled to a greater or lesser degree as a function of the passing intake air. This causes an unbalancing of the bridge circuit. This unbalancing of the bridge circuit is controlled in that the control amplifier 15, via the voltage-controlled electrical current source 23, 24, 25 and 26, furnishes an increased supply current for the bridge circuit, so that the temperature of the temperature-dependent resistor 11, and thus its resistance value, is held to a value which remains at least approximately constant. The electrical current flowing through the bridge circuit is a standard for the air mass flowing past the temperature-dependent resistor 11. A corresponding electrical signal can be picked up between a terminal 36 and a terminal 39.

To facilitate startup of the control device, the voltage divider 27, 28 with the diode 37 is provided. When the control apparatus is switched on, a voltage of approximately 0.5 volts is applied at the inverting input of the control amplifier 15, permitting reliable startup of the control apparatus. In contrast thereto, during normal operation, the voltage at the inverting input of the control amplifier 15 will be substantially above this initial voltage, so that the diode 37 is blocked and thus no influence can be exerted on the control procedures via the voltage divider 27, 28.

The temperature-dependent resistor 11 is embodied as a hot wire, and in order to remove deposits, from time to time, from the surface of the temperature-dependent resistor 11, an increased current is caused to flow through this temperature-dependent resistor 11 after the performance of a predetermined measurement cycle. By way of example, a predetermined operational duration of the engine may be selected as the measurement cycle in question. It has proved to be particularly efficient to trigger the glow burnoff process upon each shutoff of the ignition system of the engine. This occurs when the ignition switch 35 is shut off. The corresponding signal is differentiated and switches the monostable multivibrator 33 into its unstable switching state. During this unstable switching state of the monostable multivibrator 33, the switching transistor 32 becomes conductive and connects the resistor 32 parallel to the resistor 14 of the bridge circuit. As a result, the bridge circuit comprising the resistors 10, 11, 12, 13 and 14 becomes highly unbalanced, such that the control amplifier 15 furnishes an increased current for the bridge circuit in order to compensate for this imbalance. This higher current heats the temperature-dependent resistor 11 for the duration of the unstable switching state of the monostable multivibrator to a temperature which is above the normal operating temperature, so that the deposits on the surface of the temperature-dependent resistor 11 burn up.

It has proved to be particularly efficient for the material from which the temperature-dependent resistor 11 is made to consist of structurally stabilized platinum wire, because this material is particularly well suited for being heated to high temperatures. This is particularly significant because of the desired burnoff process.

The reference resistor 12 is efficiently also housed in the flow cross section indicated by a broken line 38, for example, the intake manifold of the engine. In this case the heat loss of the reference resistor 12 can be conducted away by the air flowing in the direction of the arrow. The resistors 13 and 14 are efficiently embodied as initially adjustable resistors, so that the temperature behavior of the control circuit can be adjusted at the outset.

Figure 2:
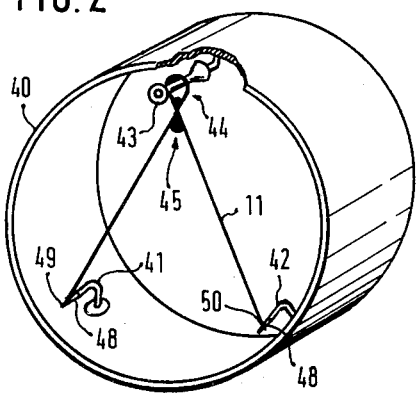
FIG. 2 is a schematic illustration of a hot wire carried in a probe ring to form a V, by three support elements.

In FIG. 2, a probe ring 40 with three support points 41, 42 and 43 is shown schematically. With the aid of the support elements 41, 42 and 43, the hot wire 11 is stretched in the form of a V. At its ends, the hot wire 11 is secured only at the two terminal support elements 41 and 42, by, for example, welding or soldering. The hot wire 11 is guided only loosely over the support element 43.

The probe ring 40 is adapted in its heat-expansion coefficient to the heat-expansion coefficient of the hot wire 11, so that changes in length of the hot wire 11 or of the probe ring 40 resulting from heat expansion cause virtually no tensile or compressive stress in the hot wire 11, but instead are substantially compensated for by changes in distance between the support elements 41, 42, 43.

The supporting of the hot wire in a manner free of tensile or compressive stress is very important if the hot wire is intended to be used, for example, as an air flow rate meter in the intake manifold of an internal combustion engine. The temperature range which must be taken into consideration in such an instance conventionally runs from −30° C. to +120° C. A still further temperature change is occasioned by the mode of operation of the hot wire 11. In addition, the hot wire is also, as described above, heated to a high temperature for the purpose of burning off deposits on its surface. This brief elevation in temperature also causes changes in length of the wire, which, if the wire is fixedly supported, can cause tensile and compressive stresses. The V-form disposition of the hot wire 11 and the adaptation of the heat-expansion coefficients of the sensor ring 40 and the hot wire 11 substantially prevent the introduction of tensile or compressive stresses into the hot wire 11. In an efficient manner, the probe ring 40, when the hot wire 11 is made of platinum, is manufactured from a nickel-iron alloy, whose heat-expansion coefficient corresponds approximately to that of platinum. It is also possible to manufacture the sensor ring from glass, particularly so-called platinum glass. The heat-expansion coefficient of such platinum glass also substantially corresponds to that of the platinum wire, so that tensile or compressive stresses during temperature changes in the hot wire 11 can be substantially prevented.

As shown in FIG. 2, the support elements 41, 42 and 43 can be bent in the form of hooks. At least the terminal support elements 41 and 42, which serve to carry electrical current, are secured in the probe ring 40 in a manner such that they are electrically insulated from it. The middle portion of the hot wire 11, which is guided about the support element 43, thus forms a mounting loop 44, with the intersecting region of the wire portions being connected to one another in an electrically conductive manner at 45, this being effected efficiently by welding or hard soldering. As a result of the connection, the loop 44 has no current flowing through it and is not heated by electrical current. Problems relating to an undefined conduction of heat away from the hot wire 11 to the support element 43 no longer occur when there are changes in length or displacements of the hot wire 11 at the support element 43. As a result of the specialized suspension at support element 43, it is also of no significance if the hot wire 11, as a result of heat expansion, lifts slightly from the support element 43, or changes position or rotates slightly.

Figure 3:
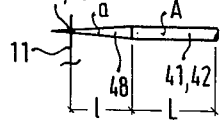
FIG. 3 is an enlarged view of a portion of one support element, shown simplified.

At least the terminal support elements 41 and 42 can each be constructed as shown in FIG. 3, i.e., including an area of substantially constant cross section and an area of continuously varying cross section terminating in a sharp point. The latter area comprises a contact area 48 located remote from the probe ring 40. The hot wire 11 is secured, for example, by soldering or welding, to the securing portion 49, 50 defined on the contact area 48 of the support elements 41 and 42. Because the contact areas are embodied as having the smallest possible cross section relative to the portion of the support elements 41 and 42 immediately adjacent to them, heat conduction away from the hot wire 11 to the support elements 41 and 42 is kept to a minimum, which improves the measurement precision of the apparatus and furthermore assures that during a glow burnoff process a sufficiently high temperature will be attained up to the securing portions 49, 50 for the hot wire 11 on the support elements 41 and 42. All the deposits on the hot wire 11 up to the securing portions 49, 50 will burn off, as is required for satisfactory functioning of the air flow rate meter.

Figure 4:
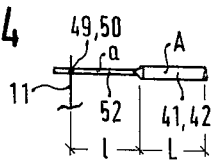
FIG. 4 is an enlarged view of a portion of an alternate embodiment of a support element, shown simplified.

In the exemplary embodiment shown in FIG. 4, a support element 41, 42 as shown in part, the contact area 52 of which is cylindrically embodied, but with a substantially smaller cross section than the adjacent area of the support elements 41, 42. This embodiment again assures the minimum possible conduction of heat away from the hot wire 11 to the support elements 41 and 42.

What is claimed and desired to be secured by Letters Patent of the United States is:

1. In an apparatus for measuring the mass of a flowing medium, such as the intake air mass to an internal combustion engine, comprising:
   a probe ring through which the medium to be measured flows;
   at least one temperature-dependent resistor through which a current flows; and
   a plurality of support elements mounted to the probe ring for mounting the resistor to the probe ring such that it is exposed to the flowing medium, wherein:
   (i) the resistor is embodied as a hot wire, a parameter of which is controlled in dependence on the mass of the flowing medium, the extent to which the parameter is controlled being a measure of the mass of the flowing medium; and
   (ii) at least one of said support elements is embodied as an elongated element having a longitudinal axis, which is improved with respect to its capacity to minimize the conduction of heat resulting from a current flowing through the resistor, each improved support element having a variable cross section along its longitudinal axis, including a contact area defining a securing portion at the minimum cross section to which the hot wire resistor is attached, further wherein each said improved support element includes two areas of different constant cross section, with the area of smaller constant cross section being cylindrical and comprising the contact area.

2. In the apparatus as defined in claim 1, wherein said plurality of support elements comprise three support elements provided on said probe ring such that the hot wire assumes a V-shape upon mounting, said hot wire includes wire portions electrically connected medially of said hot wire thus defining an intersecting region, and said hot wire further includes a mounting loop disposed opposite said intersecting region, said intersecting region serving to insulate electrically said mounting loop from said hot wire.

* * * * *